US011874370B2

(12) United States Patent
Löffler et al.

(10) Patent No.: US 11,874,370 B2
(45) Date of Patent: Jan. 16, 2024

(54) METHOD FOR ACQUIRING ENVIRONMENT INFORMATION BY MEANS OF MULTIPLE RADAR SENSORS

(71) Applicants: Continental Autonomous Mobility Germany GmbH, Ingolstadt (DE); Volkswagen AG, Wolfsburg (DE)

(72) Inventors: Andreas Löffler, Weiler-Simmerberg (DE); Fabian Harrer, Munich (DE); Thomas Gisder, Much (DE); Marc-Michael Meinecke, Sassenburg (DE); Thorsten Bagdonat, Braunschweig (DE)

(73) Assignees: CONTINENTAL AUTONOMOUS MOBILITY GERMANY GMBH, Ingolstadt (DE); VOLKSWAGEN AG, Wolfsburg (DE)

( * ) Notice: Subject to any disclaimer, the term of this patent is extended or adjusted under 35 U.S.C. 154(b) by 318 days.

(21) Appl. No.: 17/281,858

(22) PCT Filed: Sep. 23, 2019

(86) PCT No.: PCT/EP2019/075509
§ 371 (c)(1),
(2) Date: Mar. 31, 2021

(87) PCT Pub. No.: WO2020/069898
PCT Pub. Date: Apr. 9, 2020

(65) Prior Publication Data
US 2021/0396870 A1 Dec. 23, 2021

(30) Foreign Application Priority Data
Oct. 1, 2018 (DE) ..................... 10 2018 124 215.8

(51) Int. Cl.
*G01S 13/931* (2020.01)
*G01S 13/87* (2006.01)
*G01S 13/90* (2006.01)

(52) U.S. Cl.
CPC .......... *G01S 13/931* (2013.01); *G01S 13/872* (2013.01); *G01S 13/90* (2013.01)

(58) Field of Classification Search
CPC ........ G01S 13/87; G01S 13/872; G01S 13/90; G01S 13/931
See application file for complete search history.

(56) References Cited

U.S. PATENT DOCUMENTS 6,005,509 A * 12/1999 Buckreuss ............... G01S 13/86
349/189
2005/0062642 A1* 3/2005 Aker ....................... G01S 13/52
342/115
(Continued)

FOREIGN PATENT DOCUMENTS

DE 112009005279 T5 1/2013
DE 102013018753 A1 6/2014
(Continued)

OTHER PUBLICATIONS

Search Report dated Aug. 22, 2019, in corresponding German Application No. 102018124215.6, 9 pages.
(Continued)

Primary Examiner — Timothy A Brainard
(74) Attorney, Agent, or Firm — CHRISTENSEN O'CONNOR JOHNSON KINDNESS PLLC

(57) ABSTRACT

A method for acquiring information in the spatial environment of a vehicle, comprising: providing at least two radar sensors arranged at different positions at the vehicle; transmitting radar signals by the radar sensors, the radar signals being assigned to the radar sensors; receiving reflected components of the radar signals assigned to the radar sensors
(Continued)

at the respective radar sensors and further processing these reflected components of the radar signals as reception information; assigning time information to the reception information obtained from the respective radar sensors, the time information forming a time reference for the reception information; assigning location information to the reception information obtained from the respective radar sensors, the location information forming a location reference for the reception information; and processing the reception information obtained from the at least two radar sensors into common environment information by taking into account the time information and the location information.

16 Claims, 4 Drawing Sheets

(56) References Cited

U.S. PATENT DOCUMENTS

| | | | |
|---|---|---|---|
| 2012/0169532 A1 | 7/2012 | Yamada et al. | |
| 2018/0113210 A1* | 4/2018 | Izadian | G01S 13/90 |
| 2018/0348363 A1* | 12/2018 | Matsunaga | B60W 30/09 |
| 2019/0204435 A1* | 7/2019 | Poiger | G01S 13/878 |
| 2019/0294176 A1* | 9/2019 | Ozbilgin | G06V 20/56 |
| 2019/0377087 A1* | 12/2019 | Shtrom | G06V 10/774 |
| 2020/0210715 A1* | 7/2020 | Golomedov | G06V 20/56 |

FOREIGN PATENT DOCUMENTS

| | | |
|---|---|---|
| DE | 102015100134 A1 | 7/2015 |
| WO | 2004/059341 A1 | 12/2003 |

OTHER PUBLICATIONS

Feger, R. et al. "Experimental verification of a 77-GHz synthetic aperture radar system for automotive applications", 2017 IEEE MTT-S International Conference on Microwaves for Intelligent Mobility (ICMIM), Mar. 19-21, 2017, pp. 111-114.

Cristallini, D. et al., "Efficient configurations of SAR sensors for improved range resolution", 2009 IEEE International Geoscience and Remote Sensing Symposium, Jul. 12-17, 2009, pp. I-52-I-55.

International Search Report dated Dec. 13, 2019, in corresponding International Application No. PCT/EP2019/075509, 4 pages.

Office Action dated May 3, 2023, issued in corresponding International Application No. PCT/EP2019/075509, filed Sep. 23, 2019, 7 pages.

* cited by examiner

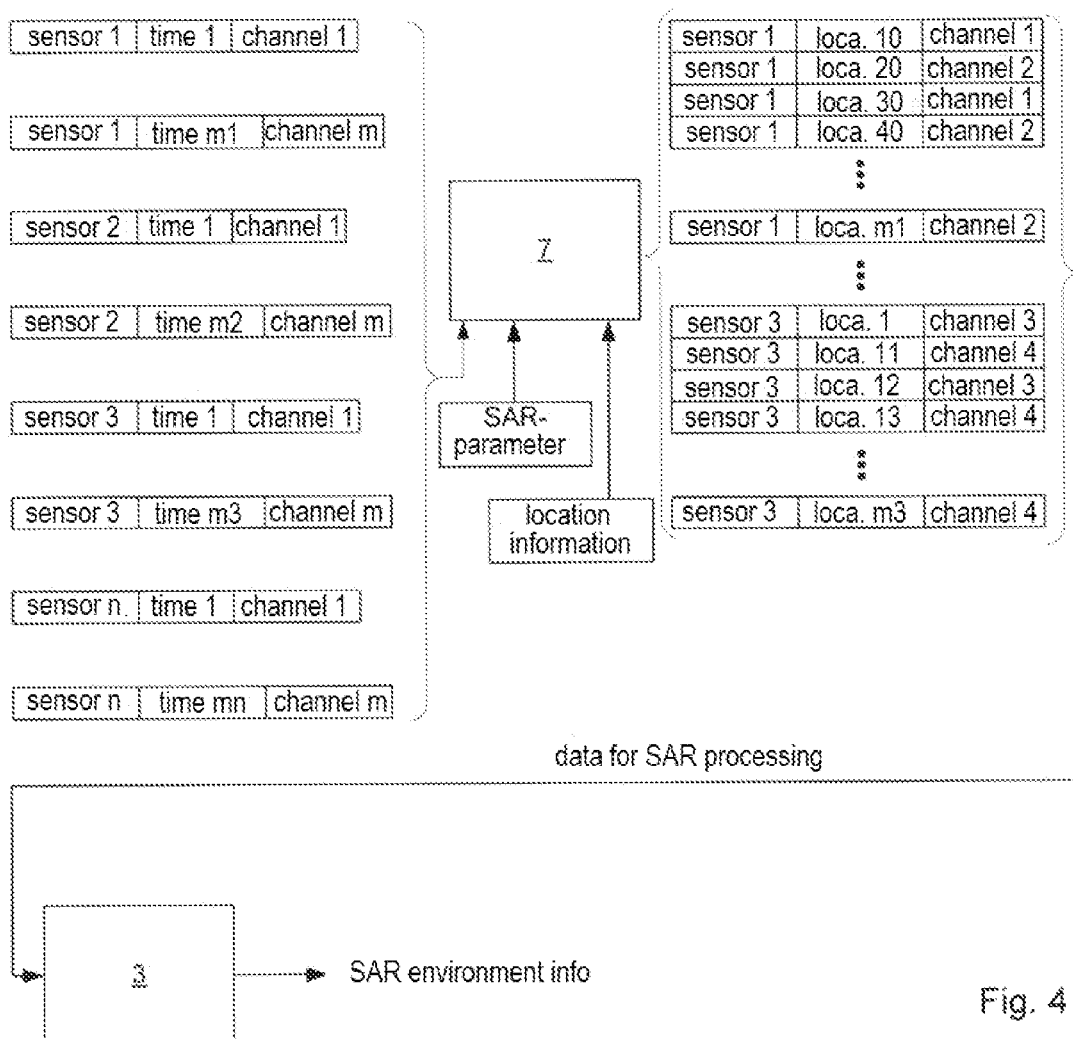

METHOD FOR ACQUIRING ENVIRONMENT INFORMATION BY MEANS OF MULTIPLE RADAR SENSORS

FIELD

The present disclosure relates to a method and a radar system for acquiring environment information by means of multiple radar sensors and to a vehicle including such a radar system.

BACKGROUND

A fast and high-resolution perception of the surroundings is required for motor vehicles with capabilities for autonomous driving or with the capability to carry out autonomous driving operations, for example an automatic parking operation.

In particular, synthetic aperture radar (SAR) is used to provide environment information with high spatial resolution. The computation of high-resolution environment information, in particular in the case of SAR radar systems, requires a very high computational effort since the radar image is calculated pixel by pixel on the basis of measurement values acquired at different locations as the vehicle moves. In this connection, it is important that the path of movement of the vehicle, also referred to as trajectory, is known in the best possible way.

In order to acquire the trajectory, the vehicle is known to comprise an odometry system including at least one sensor for acquiring information with regard to the movement of the vehicle in space. In particular, the odometry system can comprise a GPS sensor, an acceleration sensor, an angle sensor and/or a gyroscope.

A disadvantage of SAR radar systems is that a relatively long distance has to be covered in order to acquire high-resolution environment information, and thus it takes a long time to provide the environment information. This leads to undesired latency periods.

SUMMARY

Based on this, an object of the present disclosure is to provide a method by means of which high-resolution environment information can be provided in a shorter time and after the vehicle has traveled a shorter distance.

This object is achieved by a method comprising the features of one or more embodiments described herein. A radar system and a vehicle comprising such a radar system are also described.

According to a first aspect, the present disclosure relates to a method for acquiring information in the spatial environment of a vehicle. As a result, the method comprises the following steps:

The vehicle is initially provided with at least two radar sensors which are arranged on different positions at the vehicle. The radar sensors can be arranged, for example, in the corner regions of the vehicle, e.g. at the front left, front right, rear left and rear right. In particular, the radar sensors can have a radiation direction that is at least partially directed to the side. The main radiation direction or main reception direction of the radar sensors can, for example, run obliquely to the longitudinal axis of the vehicle, with the oblique position being, for example, in the angular range between 45° and 70°, with the angles opening towards the front or rear with respect to the vehicle. This orientation is preferably suitable for acquiring environment information on the basis of a SAR algorithm.

Alternatively, other orientations of the radar sensors can also be selected, for example, radiation perpendicular or substantially perpendicular to the longitudinal axis of the vehicle.

Subsequently, radar signals are transmitted by the radar sensors, the radar signals being assigned to the radar sensors. This means that the radar signals transmitted by one of the radar sensors can be clearly assigned to this radar sensor, so that the respective radar sensor further processes only those reflected components of the radar signals that were also transmitted by this radar sensor. In other words, the processing of reflected components of radar signals from another radar sensor can be effectively avoided by assigning the radar signals to a radar sensor.

Thereafter, reflected components of the radar signals assigned to the radar sensors are received at the respective radar sensors and these reflected components of the radar signals are further processed as reception information. The reception information is, for example, digital signals.

Time information is then assigned to the reception information received from the respective radar sensors, the time information forming a time reference or time stamp for the reception information. In other words, the time information or time stamp can be used to identify the time at which this reception information was received. It should be noted here that time information does not have to be assigned to each reception information but that time information can form a time reference for multiple pieces of reception information, for example, if the arrangement of reception information in a chain of reception information is known, so that an assignment of time information to reception information at the beginning of a chain of reception information is sufficient to be able to characterize the entire reception information in the chain in terms of time.

In addition, location information is assigned to the reception information received from the respective radar sensors. In this connection, the location information forms a location reference for the reception information, i.e. the location information indicates, for example, at which local position the reception information was acquired.

Finally, the reception information received from the at least two radar sensors is processed to form common environment information, taking into account the time information and the location information. In other words, the reception information received from the at least two radar sensors is further processed or combined into a common radar image.

An advantage of the method according to the an embodiment of the present disclosure is that the reception information can be processed into common environment information or a common radar image by radar sensors which are arranged at different positions on the vehicle since the temporal and spatial identification of the reception information is used to render possible a temporal and spatial correlation and thus common processing. As a result, high-resolution environment information can be provided as the vehicle travels a shorter distance or in a shorter amount of time.

According to one exemplary embodiment, the radar sensors provide reception information which can subsequently be processed by means of a SAR algorithm. In particular, the reception information is information obtained from the received reflected components by down-converting (e.g., from a higher frequency (RF) used for transmission to baseband). In the event that the signals emitted by the radar sensor are frequency ramps (i.e. FMCW radar signals), i.e. signals with a changing, in particular linearly changing frequency over time, the reception information has one or more range-dependent frequencies. These frequencies are known to a person in the art under the term "beat frequencies" in connection with FMCW radar signals. The time information is such or has an accuracy such that the reception information, which originates from different radar sensors, can be synchronized in terms of time and correlated in terms of location. In particular, the reception information can be complex-valued signals that can also be synchronized with phase accuracy via the time information.

According to one exemplary embodiment, the reception information obtained from the individual radar sensors is synchronized in terms of time with respect to one another on the basis of the time information. In particular, the reception information of the individual radar sensors can be correlated to one another in terms of time via the time information, so that the reception information obtained from different radar sensors can be combined and jointly processed for the calculation of SAR environment information.

According to one embodiment, the reception information obtained from the individual radar sensors is correlated to one another in terms of location on the basis of the location information. In particular, the reception information of the individual radar sensors can be correlated to one another in terms of location on the basis of the location information, so that the reception information received from different radar sensors can be combined and jointly processed for the calculation of SAR environment information.

According to one exemplary embodiment, the environment information is obtained by combining the reception information obtained from the different radar sensors and jointly processing this reception information into the environment information. Thus, the reception information acquired by different radar sensors is combined, and the local offset thereof is used to obtain the environment information after the vehicle has traveled a shorter distance.

According to one exemplary embodiment, the reception information is jointly processed in a SAR processing unit. The SAR processing unit receives, for example, the reception information from the individual radar sensors to which time information is assigned. In the event of radar sensors with multiple channels, reception information separated according to channels can be available. The SAR processing unit also receives the location information. The location information can also be correlated with time information, so that location information can be assigned to the reception information via the time information. In other words, the time information can be used to determine at which location the respective reception information was acquired. As a result, the SAR processing unit is able to calculate common SAR environment information or a SAR radar image from the reception information originating from different radar sensors.

According to one exemplary embodiment, the SAR processing unit is provided in the vehicle as a unit independent of the radar sensors, or the SAR processing unit is integrated into one of the radar sensors. The SAR processing unit can use one or more processors (CPU) and, where applicable, also one or more graphics processing units (GPU) for calculating the SAR environment information.

According to one exemplary embodiment, the environment information is provided as SAR environment information, i.e., the reception information of the radar sensors is processed into SAR environment information by means of a SAR algorithm.

According to one exemplary embodiment, the environment information is calculated in the SAR processing unit by complex-valued processing taking amplitudes and phases of time-synchronized and locally correlated reception information of the radar sensors into account. Thus, reception information originating from different radar sensors can be processed into SAR environment information in a SAR algorithm.

According to one exemplary embodiment, the positioning of the radar sensors at different places of the vehicle is compensated. This compensation is preferably carried out in such a way that the reception information acquired by the different radar sensors is referred to a uniform coordinate system on which the SAR algorithm is based and, on the basis of this uniform coordinate system, the local offset of the respective radar sensor is taken into account when processing the reception information of the respective radar sensor.

According to one exemplary embodiment, time information is assigned to the location information provided by an odometry unit of the vehicle. By means of this time information, the location information can be correlated in terms of time with the reception information (to which time information is assigned as well), so that it can be determined at which local position reception information, also referred to as radar data, was received.

According to one exemplary embodiment, the time information is provided by a time synchronization unit of the vehicle. In particular, the time synchronization unit provides time information with an accuracy such that the reception information can be synchronized with phase accuracy.

According to one exemplary embodiment, the reception information provided by the radar sensors and/or the location information is interpolated in order to be able to assign the reception information to the location information in a time-synchronized manner. In particular, if the location information and the reception information are not generated synchronously in terms of time but at different times, this interpolation can be used to compensate for a time offset between the reception information and the location information so that it can be determined with improved accuracy at which location the reception information was obtained.

For the processing in the SAR algorithm, the reception information successive in terms of time must each have the same spatial distance. In other words, there must be the same spatial distance between two immediately successive radar samples in order to provide sufficiently good SAR environment information. This requires a further processing step prior to the actual processing of the reception information by means of a SAR algorithm, namely a mapping of the reception information to a local grid with an equidistant local grid size. In particular, the reception information, which can originate from different radar sensors, is interpolated to this local grid.

According to one exemplary embodiment, the reception information provided by the radar sensors and/or the location information is buffered. For this purpose, a buffer can be provided in which the reception information and/or the location information can be temporarily stored and then extracted as needed according to SAR processing parameters predetermined by the SAR processing algorithm.

According to another aspect, the present disclosure relates to a radar system for a vehicle. The radar system comprises:
at least two radar sensors provided at different positions at the vehicle, the radar sensors being configured to transmit radar signals, to receive reflected components of the radar signals assigned to the respective radar sensor and to further process them into reception information;

a time synchronization unit configured to provide time information;

an odometry unit configured to provide location information;

a unit configured to assign time information to the reception information obtained from the respective radar sensors, the time information forming a time reference for the reception information;

a unit configured to assign location information to the reception information obtained from the respective radar sensors, the location information forming a location reference for the reception information; and a processing unit configured to process the reception information, received from the at least two radar sensors, by taking into account the time information and the location information to form common environment information.

"Reception information" in the sense of the present disclosure is understood to mean information provided by the radar sensor in the time domain or in the frequency domain, in particular digital information obtained after down-converting RF to baseband and analog-to-digital conversion. Preferably, the reception information is complete, unfiltered information, i.e. it still has the complete information content.

"Environment information" in the sense of the present disclosure is understood to mean information that reproduces objects present in the environment of the vehicle, for example in graphical form. The environment information can, for example, be information that can be displayed on a radar map.

"Location information" in the sense of the present disclosure is understood to mean information that marks the geographical position of the vehicle in space or its orientation in space in terms of location.

The expressions "approximately", "substantially" or "about" in the sense of the present disclosure mean deviations from the respectively exact value by +/−10%, preferably by +/−5% and/or deviations in the form of changes which are insignificant for the function.

Further developments, advantages and possible applications of the present disclosure also result from the following description of exemplary embodiments and from the drawings. In this connection, all the features described and/or depicted are in principle the subject matter of the present disclosure, either individually or in any combination, irrespective of their summary in the claims or their back-reference. Also, the content of the claims is made a part of the description.

BRIEF DESCRIPTION OF THE DRAWINGS

The invention is explained in more detail below with reference to the drawings by means of exemplary embodiments, wherein:

FIG. 4 shows exemplarily and schematically a block diagram of a radar subsystem, by means of which the reception information originating from different radar sensors is processed into environment information.

DETAILED DESCRIPTION

Figure 1:
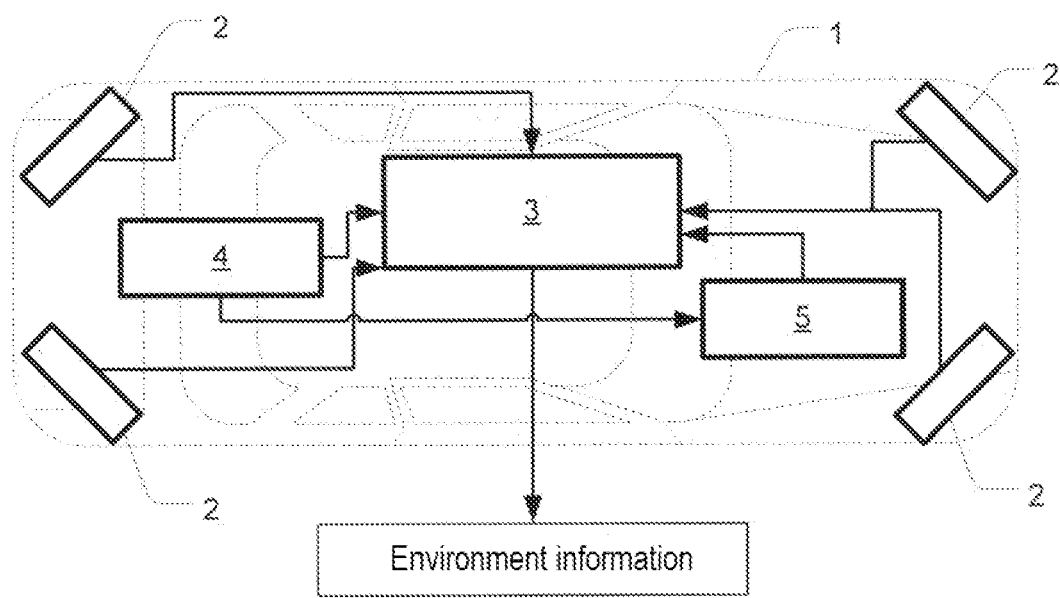
FIG. 1 shows exemplarily and schematically a vehicle with a radar system in a top view.

FIG. 1 shows an example of a schematic representation of a vehicle 1 on which multiple radar sensors 2 are installed. In the illustrated exemplary embodiment, these radar sensors are arranged in the corner regions of the vehicle 1, so that the radar sensors 2 have a detection range obliquely to the front and to the side or obliquely to the rear and to the side.

In particular, the radar sensors 2 are designed in such a way that they provide reception information which can be processed by a corresponding processing unit into a SAR radar image, also referred to here as SAR environment information.

In order to be able to calculate the SAR environment information in the most time-saving manner possible, so that the vehicle 1 travels only a short distance in the calculation time, the SAR environment information is calculated taking into account reception information provided by a plurality of radar sensors 2 arranged at different places on the vehicle 1.

In order to calculate the SAR environment information, the vehicle 1 in the illustrated exemplary embodiment has a SAR processing unit 3. In the illustrated exemplary embodiment, the SAR processing unit 3 is designed as a central unit which is independent of the radar sensors 2 and which receives reception information from all radar sensors 2 in order to calculate common SAR environment information on the basis thereof. In other words, reception information from at least two radar sensors 2 arranged at different places on the vehicle 1 is taken into account for the common SAR environment information. Notwithstanding the above, the SAR processing unit 3 can also be integrated into one of the radar sensors 2, so that the SAR environment information is calculated by a computing unit of a radar sensor 2. It is understood that for the calculation of the SAR environment information also only a subset of the radar sensors 2 is selected and the reception information thereof is further processed into the common SAR environment information.

In addition, the vehicle 1 has a time synchronization unit 4. This time synchronization unit 4 is designed to provide time information by means of which the reception information provided by the radar sensors 2 can be marked. Such time information forms, for example, a time stamp which represents a reference for the respective reception information in terms of time. Using this time information, the reception information of different radar sensors 2 or the reception information originating from different channels of a radar sensor 2 can then be classified in terms of time in subsequent processing and processed jointly to form a radar image.

The vehicle 1 also has an odometry unit 5 which is designed to provide location information. For the calculation of high-resolution SAR environment information, it is necessary to know as precisely as possible the locations at which the radar signals were emitted or their reflected components were received in order to synthetically extend the antenna aperture. The odometry unit 5 is preferably designed to evaluate information from a plurality of sensors or other sources and, based thereon, to provide location information in order to assign this information to the reception information of the respective radar sensors 2 and thus to mark the reception information with a local reference at which location respective radar data was obtained. In particular, the location information can be used to determine at which location a particular radar signal was emitted or at which location a reflected component of the radar signal was received at the radar sensor 2.

Advantageously, reflected components of the radar signals are only processed in each case by the radar sensor 2 that emitted the respective radar signal.

The SAR processing unit 3 preferably receives reception information provided by the at least two radar sensors 2. Time information is assigned to this reception information on the basis of the time synchronization unit 4 and can be used to relate the information originating from different radar sensors 2 or different channels of these radar sensors 2 to one another in terms of time. In particular, however, it is also possible to assign to the reception information location information indicating at which local position of the vehicle 1 the reception information was acquired. In other words, by means of the time information, it is possible to synchronize the information originating from different radar sensors 2 or different channels of these radar sensors 2 with respect to one another in terms of time. The location information makes it possible to correlate the information originating from different radar sensors 2 or different channels of these radar sensors 2 to one another in terms of location.

The time information can be assigned to the reception information in a processing unit 6 downstream of the radar sensors 2. In this case, the processing unit 6 receives the time information of the time synchronization unit 4 and assigns this time information to the reception information. Alternatively, it is possible that the assignment of the time information to the reception information is already carried out in the radar sensors 2 themselves. For example, the time synchronization unit 4 can be coupled to the radar sensors 2. The time information provided by the time synchronization unit 4 can then be assigned in the respective radar sensor 2 to the reception information generated by it. For example, the time synchronization unit 4 and the radar sensors 2 can be coupled via a precision time protocol (PTP) network, so that an assignment of time information to the reception information (i.e. time stamping) can be carried out by this PTP network. Likewise, the odometry unit 5 can also be connected to this PTP network.

Based on the reception information provided by at least two radar sensors 2, the common environment information, in particular the SAR radar image, can then be calculated when taking into account the time information and the location information. In other words, taking into account the time information and the location information, the reception information provided by the at least two radar sensors 2 is combined to thus arrive at common environment information that takes into account information originating from the at least two radar sensors 2.

Figure 2:
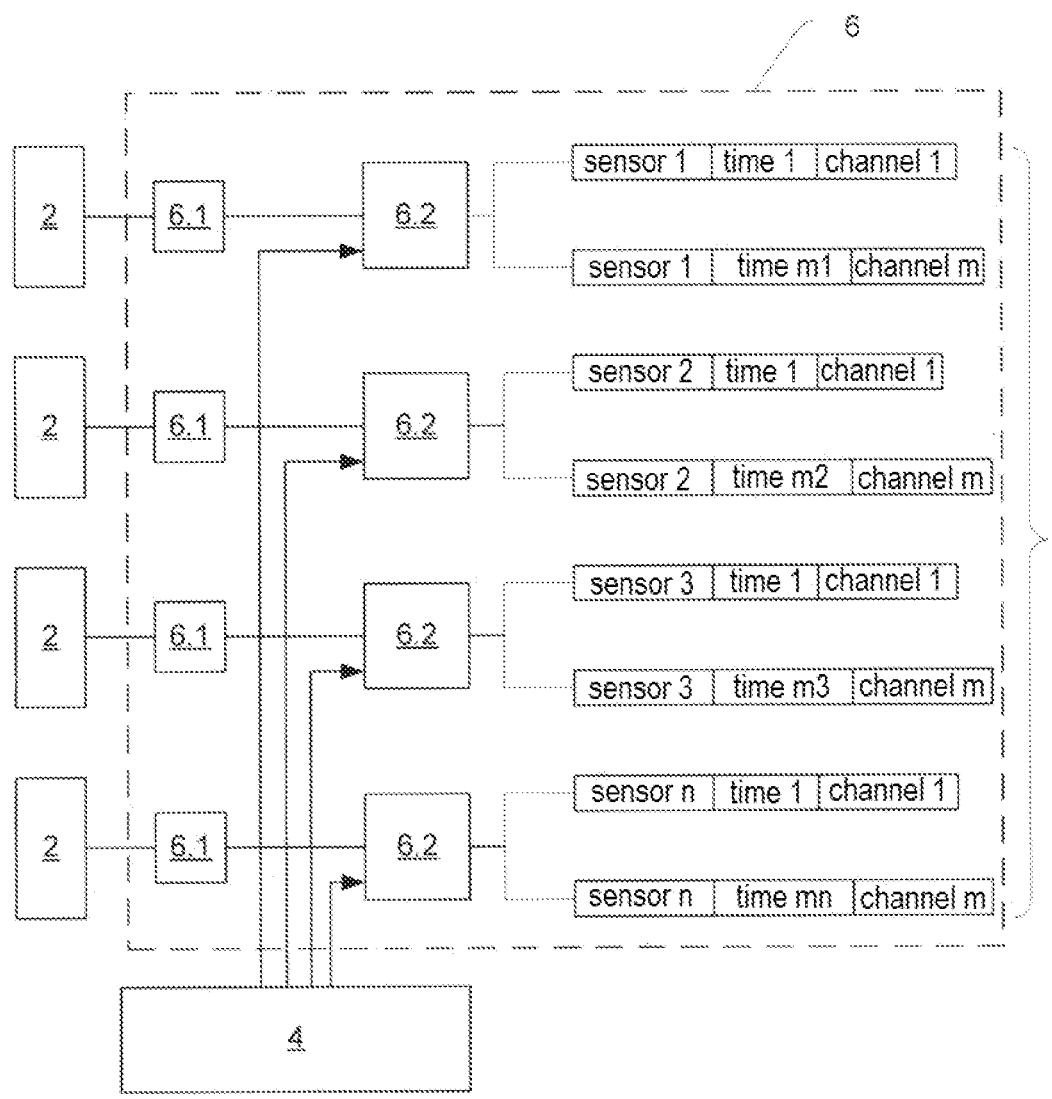
FIG. 2 shows exemplarily and schematically a block diagram of a radar subsystem, in which the reception information is separated according to channels and time information is assigned to these channels.

FIG. 2 shows a schematic block diagram for generating a time-synchronous stream of SAR reception information, in particular a time-synchronous stream of SAR radar reception data. The time-synchronous stream of SAR reception information can be generated in a processing unit 6 (indicated in FIG. 2 by the dashed rectangle) connected upstream of the SAR processing unit 3.

The reception information provided by the radar sensors 2 is preferably received at an input interface 6.1 of the processing unit 6 in each case. This reception information is separately available for the respective radar sensors 2, preferably as digital signals. Subsequently, this reception information is supplied, for example, to an extraction unit 6.2, in which the reception information received from the respective radar sensors 2—in the event that at least some of the radar sensors 2 have multiple channels—is split into their individual channels. This results, for example, in a plurality of channel-specific reception information streams for each radar sensor 2. The radar information contained in the channel-specific reception information streams has, at least in part, time information. This time information is inserted into the channel-specific reception information streams in the extraction unit 6.2, for example.

In this case, time information can be assigned to each radar information contained in the channel-specific reception information streams. Alternatively, it is possible that time information is only assigned selectively to radar information in a channel-specific reception information stream. This is in particular possible if the time sequence of the radar information in the reception information stream is known. In this case, for example, time information can then only be assigned to the radar information at the beginning of a measurement cycle. The time information for the further radar information then results from the position thereof in the channel-specific reception information stream.

Reception information streams separated according to radar sensors 2 and preferably according to their respective reception channels are then provided at the output interface of the processing unit 6, with time information being assigned to the radar information contained in the individual reception information streams either directly or at least indirectly (via preceding time information and the position of the radar information in the reception information stream).

Figure 3:
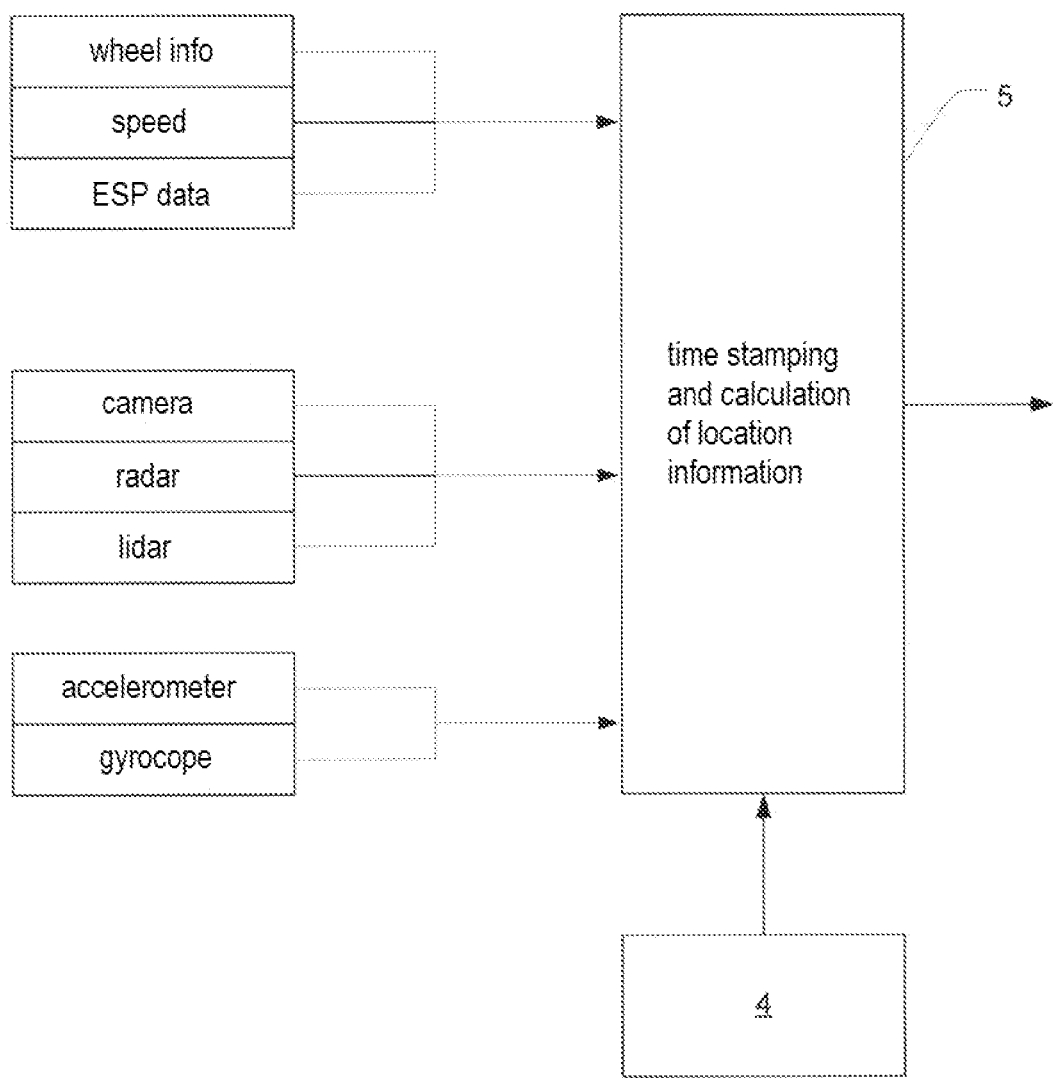
FIG. 3 shows exemplarily and schematically a block diagram of a radar subsystem which is designed to generate location information and to assign time information to this location information.

FIG. 3 shows a schematic block diagram for generating location information provided with time information. Measurement information from different sensors and measurement units is provided to an odometry unit 5. This is, for example, information provided by a wheel sensor (e.g. rotation information of the wheels), speed measurement values and/or information of an ESP system (ESP: electronic stability program) of the vehicle.

Additionally or alternatively, sensor information of e.g. a radar sensor of a LIDAR sensor and/or a camera can be supplied to the odometry unit 5.

Furthermore, information from an inertial measurement unit (for example, containing one or more accelerometers and/or one or more gyroscopes) can be supplied to the odometry unit 5.

Based on the above mentioned received information, the odometry unit 5 can calculate location information, also referred to as odometry information. This location information is used to determine at which local position the respective reception information provided by the radar sensors 2 was determined.

The odometry unit 5 also receives time information from the time synchronization unit 4 to assign time information, in particular a time stamp, to the location information. On the basis of the information provided by the odometry unit 5 at its output interface, it is thus possible to determine at which location the vehicle 1 was at a particular time. The location information preferably relates to a coordinate system of the vehicle 1 located in the area of the rear axle of the vehicle 1.

In the event that the location information and the reception information provided by the radar sensors 2 are not generated synchronously in time, i.e. are not synchronized with one another or have a time offset, the location information and/or the reception information can be interpolated. In other words, this is used to calculate intermediate values indicating at which location the vehicle was at a particular time when reception information was acquired. Interpolation of the reception information is also possible.

FIG. 4 shows a schematic block diagram illustrating the calculation of the environment information, in particular the SAR environment information from the reception information of the radar sensors 2 that is correlated with time information and the location information that is correlated with time information.

For generating the environment information, in particular a SAR radar image, a buffer 7 can be provided which receives the output information provided by the processing unit 6 (see FIG. 2). In particular, these are the above specified reception information streams separated according to radar sensors 2 and their respective reception channels (left-hand input streams in FIG. 4).

In addition, the buffer 7 preferably also receives location information correlated with time information, as explained in more detail above in connection with FIG. 3.

Furthermore, SAR parameters can be supplied to the buffer 7; they indicate the manner in which data is to be extracted from the buffer 7 for calculation of the environment information by the SAR processing unit 3. The SAR parameters can be, for example, timing clock information or a local sampling rate (e.g. every 2 mm).

By means of the buffer 7, it is possible to combine and temporarily store the above mentioned data in order to subsequently provide the data to the SAR processing unit 3 as required and, where applicable, interpolated—as explained above.

Preferably, the reception information provided by the individual radar sensors 2 is synchronized in terms of time and correlated in terms of location on the basis of the time information and the location information. This is preferably done in such a way that the data extracted from the buffer 7 and supplied to the processing unit 3 is such as if it originated from a single radar sensor 2 with an increased number of channels.

When frequency ramps are used as transmit signals, i.e. signals in which the frequency is varied in a ramp-like manner, for example, linearly over time (so-called FMCW radar), the reception information obtained after down-converting has one or more beat frequencies, i.e. a signal that has a range-dependent frequency. On the basis of the time information and the location information, the reception information originating from different radar sensors 2 is synchronized in terms of time and correlated in terms of location.

The data extracted from the buffer 7 is then processed in the processing unit 3 to form environment information, in particular SAR environment information or a SAR radar image. For this purpose, it is necessary to process the respective data extracted from the buffer 7 into environment information according to a SAR algorithm. The processing can be carried out by one or more processors or processor cores (CPUs), graphics processing units (GPU) or a mixture of at least one CPU and at least one GPU.

In computing the environment information, it can be necessary to transform the location information. In the event that the location information provided by the odometry unit 5 refers to a coordinate system different from the coordinate system used by the SAR processing unit 3 to calculate the environment information, the location information can be transformed to the coordinate system used by the SAR processing unit 3.

In addition, further transformation of the location information may be necessary because the radar sensors 2 are arranged at different places on the vehicle 1. In particular, it can be necessary to carry out a local transformation of the respective location information assigned to the reception information provided by a radar sensor 2 from a position where this radar sensor 2 is arranged to a position where the coordinate system used by the SAR processing unit 3 is arranged.

The invention has been described above by means of exemplary embodiments. It is understood that numerous changes and modifications are possible without departing from the scope of protection defined by the claims.

LIST OF REFERENCE SIGNS 1 vehicle
2 radar sensor
3 SAR processing unit
4 time synchronization unit
5 odometry unit
6 processing unit
6.1 input interface
6.2 extraction unit
7 buffer

The invention claimed is:

1. A method for acquiring information in the spatial environment of a vehicle, comprising the following steps:
providing at least two radar sensors arranged at different locations of the vehicle;
transmitting radar signals by the radar sensors, the radar signals being assigned to the radar sensors;
receiving reflected components of the radar signals assigned to the radar sensors at the respective radar sensors and further processing these reflected components of the radar signals as reception information;
assigning time information to the reception information obtained from the respective radar sensors, the time information forming a time reference for the reception information;
assigning location information to the reception information obtained from the respective radar sensors, the location information forming a location reference for the reception information; and
processing the reception information obtained from the at least two radar sensors into common environment information by taking into account the time information and the location information.

2. The method according to claim 1, wherein the radar sensors provide reception information which can be processed by a synthetic aperture radar (SAR) algorithm to form environment information.

3. The method according to claim 1, wherein the reception information obtained from the individual radar sensors is synchronized to one another in terms of time on the basis of the time information.

4. The method according to claim 1, wherein the reception information obtained from the individual radar sensors is correlated with one another in terms of location on the basis of the location information.

5. The method according to claim 1, wherein the environment information is obtained by combining the reception information obtained from the different radar sensors and jointly processing this reception information to form the environment information.

6. The method according to claim 5, wherein the reception information is jointly processed in a SAR processing unit.

7. The method according to claim 6, wherein the SAR processing unit is provided in the vehicle as a unit independent of the radar sensors or the SAR processing unit is integrated into one of the radar sensors.

8. The method according to claim 5, wherein the environment information is calculated in a SAR processing unit by a complex-valued processing taking the amplitudes and phases of time-synchronized and locally correlated reception information of the radar sensors into account.

9. The method according to claim 1, wherein the environment information is provided as SAR environment information.

10. The method according to claim 1, wherein the locally different positioning of the radar sensors on the vehicle is compensated.

11. The method according to claim 1, wherein time information is assigned to the location information provided by an odometry unit of the vehicle.

12. The method according to claim 1, wherein the time information is provided by a time synchronization unit of the vehicle.

13. The method according to claim 1, wherein the reception information provided by the radar sensors and/or the location information is interpolated in order to be able to assign the reception information to the location information in a time-synchronized manner.

14. The method according to claim 1, wherein the reception information provided by the radar sensors and/or the location information is buffered.

15. Radar system for a vehicle comprising:
at least two radar sensors which are arranged at different positions at the vehicle, the radar sensors being configured to transmit radar signals, to receive reflected components of the radar signals assigned to the respective radar sensor and to process them further to form reception information;
a time synchronization unit configured to provide time information;
an odometry unit configured to provide location information;
a unit configured to assign time information to the reception information obtained from the respective radar sensors, the time information forming a time reference for the reception information;
a unit configured to assign location information to the reception information obtained from the respective radar sensors, the location information forming a location reference for the reception information; and
a processing unit configured to process the reception information obtained from the at least two radar sensors by taking into account the time information and the location information to form common environment information.

16. A vehicle comprising a radar system according to claim 15.

* * * * *